US009959866B2

(12) United States Patent
Takahashi et al.

(10) Patent No.: US 9,959,866 B2
(45) Date of Patent: May 1, 2018

(54) COMPUTER-IMPLEMENTED METHOD FOR GENERATING A RESPONSE SENTENCE BY USING A WEIGHT VALUE OF NODE

(71) Applicant: Panasonic Intellectual Property Management Co., Ltd., Osaka (JP)

(72) Inventors: Viviane Takahashi, Tokyo (JP); Mitsuru Endo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 46 days.

(21) Appl. No.: 15/076,654

(22) Filed: Mar. 22, 2016

(65) Prior Publication Data
US 2016/0293162 A1 Oct. 6, 2016

(30) Foreign Application Priority Data

Apr. 2, 2015 (JP) ................................. 2015-075516
Dec. 28, 2015 (JP) ................................. 2015-256787

(51) Int. Cl.
*G10L 13/00* (2006.01)
*G10L 15/22* (2006.01)
*G06F 17/27* (2006.01)

(52) U.S. Cl.
CPC .......... *G10L 15/22* (2013.01); *G06F 17/2785* (2013.01)

(58) Field of Classification Search
None
See application file for complete search history.

(56) References Cited

U.S. PATENT DOCUMENTS

| 6,314,398 | B1 | 11/2001 | Junqua et al. |
| 8,671,353 | B1* | 3/2014 | Varadarajan ....... G06Q 30/0201 715/763 |
| 9,767,417 | B1* | 9/2017 | Hoover .................... G06N 7/02 |
| 2004/0193403 | A1* | 9/2004 | Creamer ............. G10L 15/1815 704/201 |
| 2007/0276807 | A1* | 11/2007 | Chen ................. G06F 17/30112 |
| 2015/0199967 | A1* | 7/2015 | Reddy ..................... G10L 25/30 704/249 |

FOREIGN PATENT DOCUMENTS

| JP | 2000-250575 | 9/2000 |
| JP | 2008-039928 | 2/2008 |

* cited by examiner

*Primary Examiner* — Kevin Ky
(74) *Attorney, Agent, or Firm* — Greenblum & Bernstein, P.L.C.

(57) ABSTRACT

A semantic network storage unit stores multiple nodes necessary for performing a task of generating a response sentence to user's speech while associating the nodes with each other. A natural language processor acquires speech information indicating content of the user's speech and identifies a primary node corresponding to the speech information from multiple nodes. A conversation generation unit selects one secondary node from multiple secondary nodes associated with the identified primary node, based on weight values each related to one of the multiple secondary nodes and generates a response sentence corresponding to the selected one secondary node.

6 Claims, 10 Drawing Sheets

FIG. 3

| NUMBER OF SELECTABLE SLOT VALUES | DETERMINATION CONDITION | SLOT VALUE TO BE OBTAINED | TEMPLATE |
|---|---|---|---|
| 2 values ($v_1$, $v_2$) | $v_1 > 50\%$ or $v_2 > 50\%$ | $v_1$ or $v_2$ | Do you want $v_1$? or Do you want $v_2$? |
| 2 values ($v_1$, $v_2$) | $v_1 = 50\%$ or $v_2 = 50\%$ | $v_1$ and $v_2$ | How about $v_1$ or $v_2$? |
| Multiple values ($v_1$, $v_2$, $\cdots$, $v_x$) | $\exists v_i > 50\%$ | $v_i$ | Do you want $v_i$? |
| Multiple values ($v_1$, $v_2$, $\cdots$, $v_x$) | $\exists v_i > 40\%$ and $v_j > 40\%$ | $v_i$ and $v_j$ | How about $v_i$ or $v_j$? |
| Multiple values ($v_1$, $v_2$, $\cdots$, $v_x$) | $v_i > 40\% \ \forall i$ | — | What (slot name) do you want? |

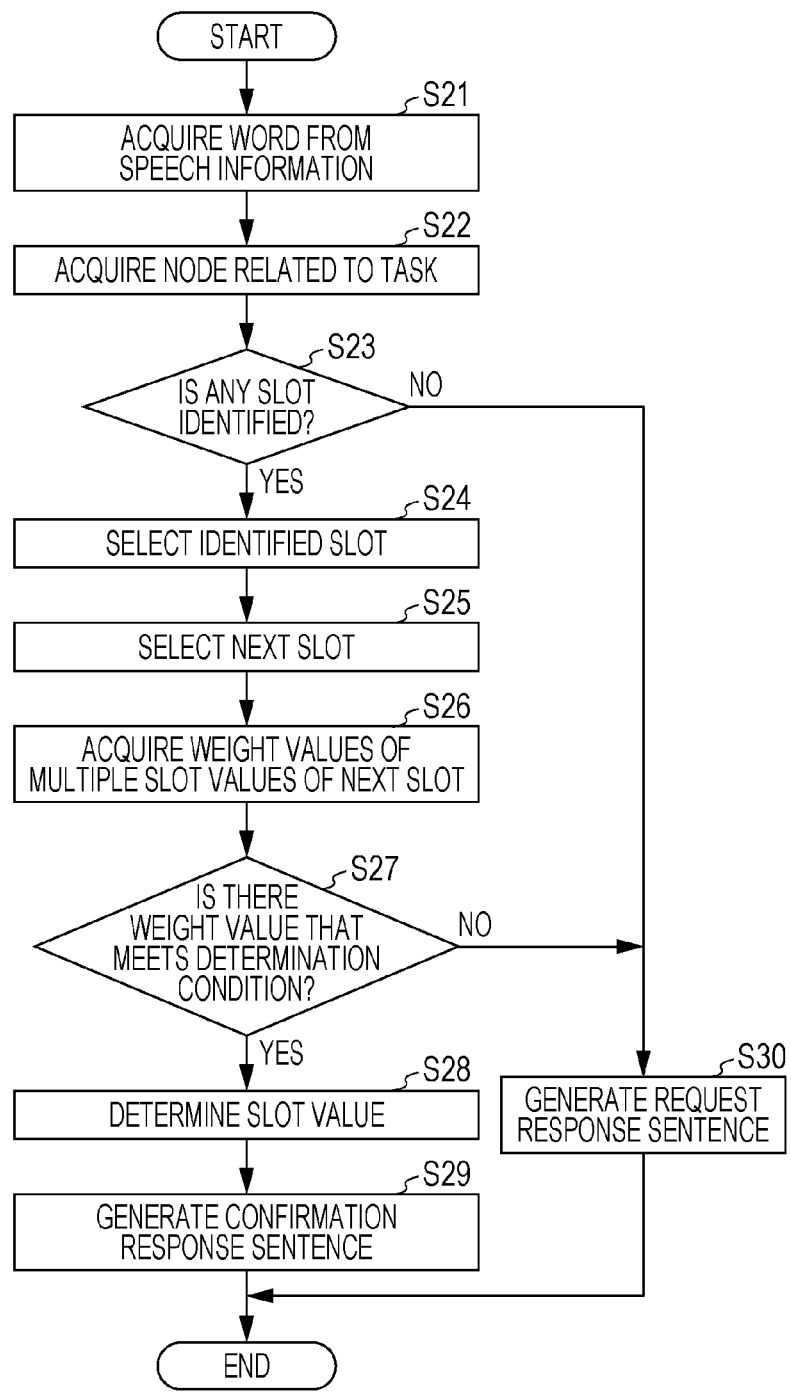

FIG. 9A

[empl]: Can I help you?
[user]: I would like meal.
[empl]: Would you like side salad or french fries? —1001
[user]: French fries. —1002
[empl]: What kind of meal main would you like? —1003
[user]: Double quarter pounder with cheese. —1004
[empl]: Would you like large, small or medium? —1005
[user]: Medium. —1006
[empl]: What kind of meal drink would you like? —1007
[user]: Hi-c orange lavaburst. —1008
[empl]: Anything else?
[user]: I would like side salad.
[empl]: Anything else?
[user]: No.
[empl]: Goodbye.

conversation length (number of characters): 330 —1009

-------------- order ---------------------- —1010
meal
    meal side ---- french fries
    meal main ---- double quarter pounder with cheese
    meal size ---- medium
    meal drink ---- hi-c orange lavaburst
side salad

FIG. 9B

[empl]: Can I help you?
[user]: I would like meal.
[empl]: Would you like french fries? 2001
[user]: Yes. 2002
[empl]: What kind of meal main would you like? 2003
[user]: Double quarter pounder with cheese. 2004
[empl]: Would you like medium? 2005
[user]: Yes. 2006
[empl]: Would you like coke? 2007
[user]: No. Hi-c orange lavaburst. 2008
[empl]: Anything else?
[user]: I would like side salad.
[empl]: Anything else?
[user]: No.
[empl]: Goodbye.

conversation length (number of characters): 273  2009

------------- order --------------------  2010
```
meal
    meal side ---- french fries
    meal main ---- double quarter pounder with cheese
    meal size ---- medium
    meal drink ---- hi-c orange lavaburst
side salad
```

COMPUTER-IMPLEMENTED METHOD FOR GENERATING A RESPONSE SENTENCE BY USING A WEIGHT VALUE OF NODE

BACKGROUND

1. Technical Field

The present disclosure relates to a dialog method in a dialog system for responding to user's speech, a non-transitory computer-readable medium having thereon a dialog program for responding to user's speech, and a dialog system for responding to user's speech.

2. Description of the Related Art

In recent years, techniques to enable a system to make efficient interactions with a user by creating a model that represents preference of the user have been proposed.

For example, a spoken dialog system described in Japanese Unexamined Patent Application Publication No. 2008-39928 makes records for recognition target keywords, each record including replacement phrases with one of which the keyword is to be replaced in a response sentence, response types indicating types of responding sentences, and conditions for selecting a replacement phrase and a response type. This spoken dialog system determines a replacement phrase and a response sentence template for the recognized keyword based on the conditions for selecting the replacement phrase and the response type, and generates a response sentence by inserting the replacement phrase into the determined response sentence template.

In addition, a conventional speech understanding system described in Japanese Unexamined Patent Application Publication No. 2000-250575 includes: a knowledge extractor that receives information of an electronic program guide (EPG), processes the EPG information, and forms a program database; a speech recognizer that receives a spoken request, translates the spoken request into a text stream including multiple words; a natural language processor that receives the text stream, processes the words to resolve a semantic content of the spoken request; and a dialog manager that analyzes a task frame to determine if a sufficient number of keyword slots have been filled and prompting the user for additional information for filing empty slots.

SUMMARY

However, the conventional speech understanding system directly asks the user a value to be inputted to a slot of the task frame, reconfirms the answer from the user, and decides the slot value. Thus, interaction between the system and the user takes long time and system processing time is also long.

The present disclosure has been made in order to solve the problems described above.

One non-limiting and exemplary embodiment provides a dialog method, a non-transitory computer-readable medium having thereon a dialog program, and a dialog system that can reduce interaction time between the dialog system and a user, as well as processing time of the dialog system. A dialog method according to one aspect of the disclosure is a dialog method used in a dialog system for responding to user's speech, the method associating each of multiple nodes necessary for performing a task of generating a response sentence to speech of the user, and storing it; acquiring speech information that indicates content of the user's speech; identifying a primary node corresponding to the speech information from the multiple nodes; selecting one secondary node from multiple secondary nodes associated with the identified primary node, based on a weight value related to each of the multiple secondary nodes; and generating a response sentence corresponding to the selected one secondary node.

In one general aspect, the techniques disclosed here feature the configuration according to which each of multiple nodes necessary for performing a task of generating a response sentence to user's speech is associated and stored. Speech information indicating content of the user's speech is acquired. A primary node corresponding to the speech information is identified from the multiple nodes. One secondary node is selected from multiple secondary nodes associated with the identified primary node, based on a weight value related to each of the multiple secondary nodes. Then, a response sentence corresponding to the selected one secondary node is generated.

Accordingly, there is no need to generate a question sentence to prompt a user to select one secondary node from multiple secondary nodes, and a response sentence corresponding to the selected one secondary node is generated based on the weight value related to each of the multiple secondary nodes. Thus, interaction time between the dialog system and a user, as well as processing time of the dialog system can be reduced.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 illustrates an example of a determination condition table;

FIG. 8 is a flowchart illustrating a spoken dialog processing of the spoken dialog system in the variation of this embodiment;

FIG. 9A illustrates an example of conversation sentences by a dialog method used in the spoken dialog system of a conventional example; and FIG. 9B illustrates an example of conversation sentences by the dialog method used in the spoken dialog system according to the disclosure.

DETAILED DESCRIPTION

Embodiments of the present disclosure are described hereinafter with reference to the accompanying drawings.

Note that the following embodiments are an example of embodied disclosure and shall not limit a technological scope of the disclosure.

Figure 1:
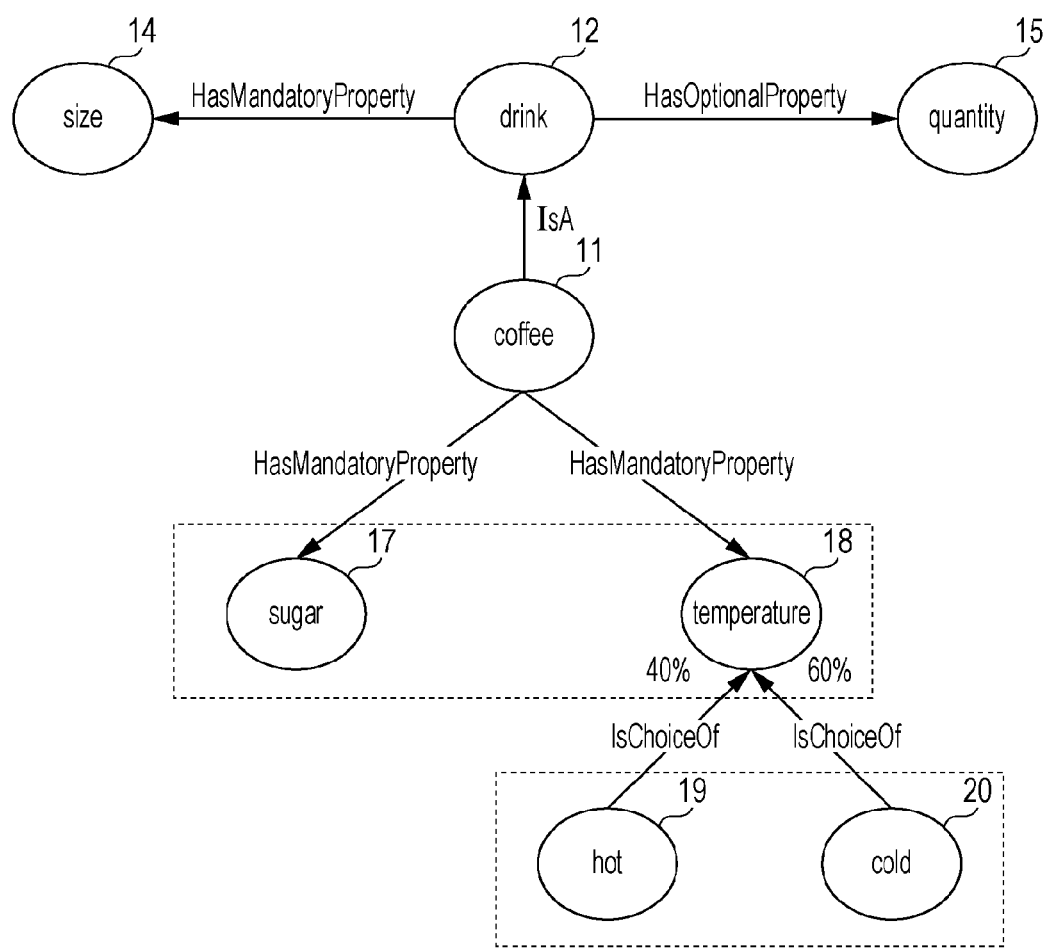
FIG. 1 illustrates an overview of a spoken dialog system in this embodiment.

FIG. 1 is a diagram illustrating an overview of a spoken dialog system in this embodiment.

An example shown in FIG. 1 illustrates an example of a semantic network used when selling a drink. The semantic network shown in FIG. 1 includes multiple nodes necessary for performing a task of generating a response sentence to user's speech. The multiple nodes are associated with each other. Relation information indicating a relationship of two nodes is assigned to the two associated nodes. Relation information includes: information indicating that one node is in a relation of lower concept with other node; information indicating that one node is a mandatory item to perform a task related to a concept included in other node; information indicating that one node is an item optionally set for a task related to a concept included in other node; and information indicating that one node is a value of other node.

For example, a node 11 representing "coffee" and a node 12 representing a "drink" are related to relation information indicating that the node 11 representing "coffee" is a lower concept (is in a relation of is-a) to the node 12 representing a "drink". Note that the node 11 representing "coffee" is also referred to as a domain.

In addition, a node 14 representing "size" and the node 12 representing a "drink" are related to relation information indicating that the node 14 representing "size" is a mandatory item to the node 12 representing a "drink". A node 15 representing "quantity" and the node 12 representing a "drink" are related to relation information indicating that the node 15 representing "quantity" is an item optionally set for the node 12 representing a "drink" and is a node determined when a user notifies the spoken dialog system of a desired quantity.

In addition, a node 17 representing "sugar" and the node 11 representing "coffee" are related to relation information indicating that the node 17 representing "sugar" is a mandatory item to perform a task to the node 11 representing "coffee". A node 18 representing "temperature" and the node 11 representing "coffee" are related to relation information indicating that the node 18 representing "temperature" is a mandatory item to perform a task to the node 11 representing "coffee". The node 17 representing "sugar" and the node 18 representing "temperature" are referred to as a mandatory slot or simply as a slot.

A node 19 representing "hot" and the node 18 representing "temperature" are related to relation information indicating that the node 19 representing "hot" is a value of the node 18 representing "temperature". A node 20 representing "cold" and the node 18 representing "temperature" are related to relation information indicating that the node 20 representing "cold" is a value of the node 18 representing "temperature". Either of the node 19 representing "hot" and the node 20 representing "cold" is selected for the node 18 representing "temperature". The node 19 representing "hot" and the node 20 representing "cold" are referred to as a slot value.

When a user purchases a drink and selects coffee, it must be decided whether or not sugar is needed and whether a drink is hot or cold. If these are not decided, the spoken dialog system cannot perform a task of generating a response sentence to speech made by the user to receive the drink. More specifically, since temperature is a mandatory node (slot) to achieve the task, the system needs to decide a value of the slot (cold or hot in this case).

Regarding temperature of coffee, a conventional system asks a user which of hot or cold the user prefers and determines the user's answer through speech recognition. When the user selects hot, the system asks the user again if hot is OK, determines the user's answer through speech recognition, and decides temperature of coffee.

In contrast to this, regarding temperature of coffee, the system of the disclosure asks a question whether a user prefers hot or not, or whether the user prefers cold or not, with assigning a weight value to each of hot and cold, instead of asking which of hot or cold the user prefers. The weight value is assigned depending on which one of hot and cold is more preferred by multiple users in the past. For example, in the past, if cold was selected with a probability of 60% and hot was selected with a probability of 40%, the system asks the user whether the user selects cold or not, determines the user's answer through speech recognition, and decides temperature of coffee. In this case, compared with the conventional system, the system of the disclosure does not reconfirm temperature, thus being able to reduce interaction time between the system and a user, as well as processing time of the system.

In addition, if the system can generate a question whose content is specific and correct, the system easily acquires necessary information for performing a task from a user. For example, when a user orders coffee, the system can limit the user's answer to either an affirmative expression or a negative expression such as "Yes" or "No" by asking "Are you fine with a hot coffee?".

Also as another case, consider a case in which a user orders a set menu that specifies a "cheeseburger set", for example. Then, when asking the user about a drink type in the set menu, the system gives an alternative question of "Which do you prefer, coke or orange juice?" based on a probability. This makes it easier to guide a user's answer to an answer, such as "I prefer coke." or "I prefer orange juice.", including content that can be accepted by the system. More specifically, by asking an alternative question, the system discourages the user from giving an unexpected answer. This increases the likelihood that a user uses an expression that can be accepted by the system, compared with a case in which the conventional technique is used, and thus enables more reliable acquisition of information from a user.

Figure 2:
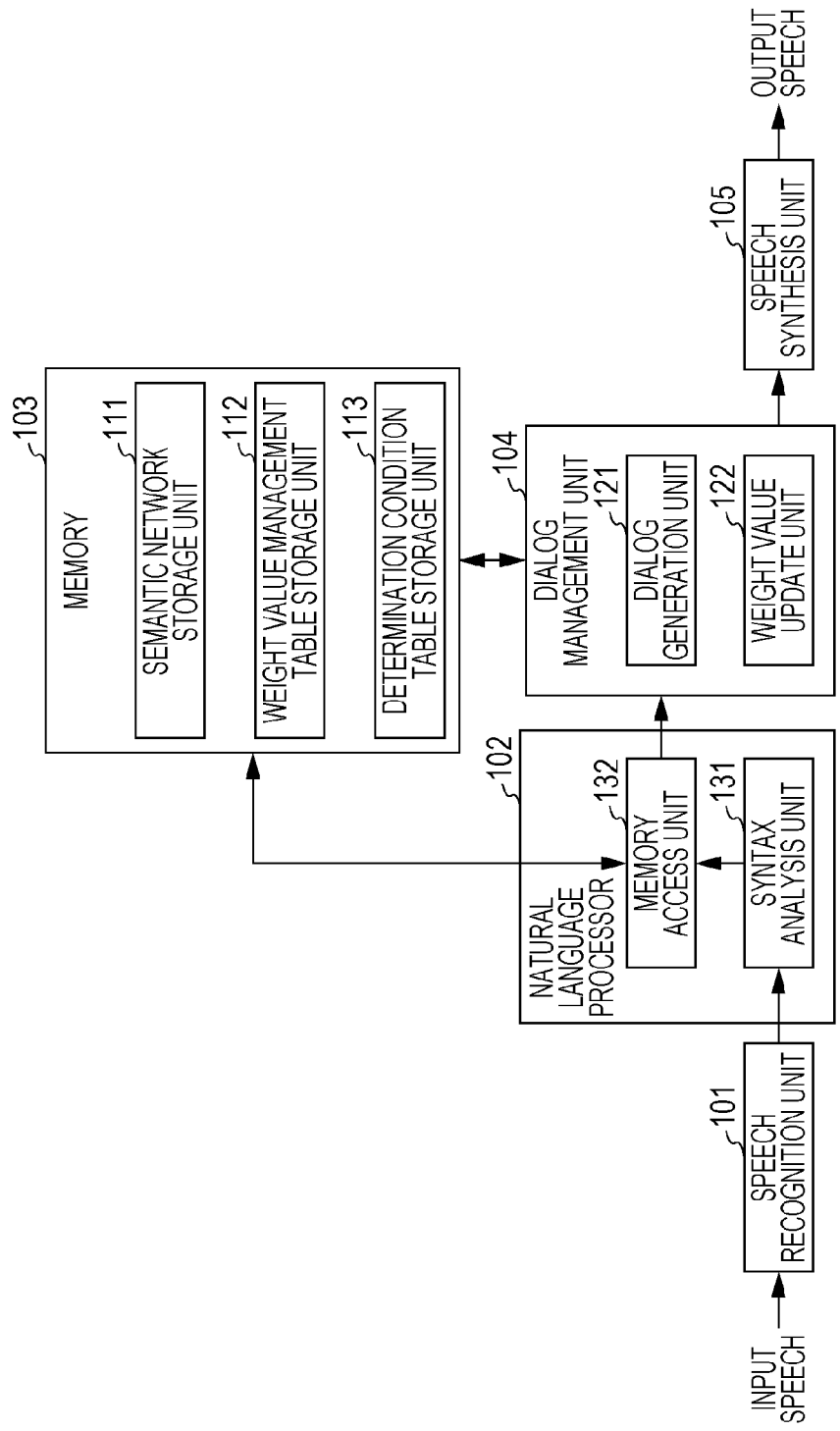
FIG. 2 illustrates a configuration of the spoken dialog system in this embodiment.

FIG. 2 is a diagram showing a configuration of the spoken dialog system in this embodiment. The spoken dialog system includes a speech recognition unit 101, a natural language processor 102, a memory 103, a conversation management unit 104, and a speech synthesis unit 105.

The memory 103 includes a semantic network storage unit 111, a weight value management table storage unit 112, and a determination condition table storage unit 113.

The semantic network storage unit 111 stores in advance a semantic network that connects multiple nodes. The semantic network storage unit 111 associates each of multiple nodes necessary for performing a task of generating a response sentence to user's speech and stores it.

The weight value management table storage unit 112 relates a value of a slot included in the semantic network to a weight value and stores them.

The determination condition table storage unit 113 stores the number of selectable slot values, a condition for selecting a slot value, a slot value to be obtained when the condition is met, and a template representing a response sentence, while associating them with each other.

The speech recognition unit 101 converts input speech acquired by a microphone (not shown) into text information.

The speech recognition unit 101 recognizes user's speech and converts it into text information.

The natural language processor 102 acquires speech information (text information) indicating content of the user's speech. The natural language processor 102 identifies a primary node (slot) corresponding to the speech information from multiple nodes. The natural language processor 102 analyzes a series of text information outputted by the speech recognition unit 101 to understand semantic content and an intention of the user's speech. The natural language processor 102 uses knowledge for language understanding stored in a language understanding database (not shown), for example, to understand content of the speech. The natural language processor 102 extracts a meaningful word from the text information. The natural language processor 102 searches a semantic network stored in the semantic network storage unit 111. When the extracted word is present in the semantic network, the natural language processor 102 extracts from the semantic network a slot relevant to a task identified by the extracted word and multiple slot values related to the slot.

The natural language processor 102 includes a syntax analysis unit 131 and a memory access unit 132. The syntax analysis unit 131 performs a processing to extract a word from content of the user's speech that is converted into a text. The memory access unit 132 searches the semantic network stored in the memory 103 for the word extracted by the syntax analysis unit 131, extracts a slot or the like, and outputs the extracted slot to the conversation management unit 104 (conversation generation unit 121).

Note that the conversation management unit 104 may include the memory access unit 132. The natural language processor 102 extracts a word from content of the user's speech that is converted into a text, and outputs the extracted word to the memory access unit of the conversation management unit 104. The memory access unit of the conversation management unit 104 may extract a slot or the like from the semantic network.

The conversation management unit 104 includes the conversation generation unit 121 and a weight value update unit 122. The conversation generation unit 121 selects one secondary node from multiple secondary nodes (slot values) associated with the primary node (slot) identified by the natural language processor 102, based on a weight value related to each of the multiple secondary nodes. Note that a weight value represents a probability that each of the multiple secondary nodes was selected by users in the past. The conversation generation unit 121 selects a secondary node whose probability is larger than a predetermined value, from the multiple secondary nodes. The conversation generation unit 121 generates a response sentence corresponding to the selected one secondary node (slot value). When no secondary node whose probability is larger than the predetermined value is present of multiple secondary nodes, the conversation generation unit 121 generates a response sentence for prompting a user to select any of the multiple secondary nodes.

The conversation generation unit 121 acquires from a weight value management table a weight value related to each of the multiple slot values extracted by the natural language processor 102 and decides one slot value based on the acquired weight value. The conversation generation unit 121 generates a response sentence corresponding to the decided slot value. Here, the conversation generation unit 121 refers to a determination condition table stored in the determination condition table storage unit 113 and determines whether or not the weight value meets a determination condition corresponding to the number of selectable slot values for a slot. When the determination condition is met, the conversation generation unit 121 inserts a slot value into a response sentence template that has been prepared in advance and generates a response sentence.

FIG. 3 is a diagram showing an example of a determination condition table.

As shown in FIG. 3, the determination condition table relates a number of selectable slots, a condition by which a slot value is selected, a slot value to be obtained when a condition is met, and a template representing a response sentence to each other.

For example, when selectable slot values are two of "$v_1$" and "$v_2$", and weight value of $v_1$ is larger than 50% and weight value of $v_2$ is smaller than 50%, the conversation generation unit 121 selects $v_1$ as a slot value. In addition, when selectable slot values are two of "$v_1$" and "$v_2$", and weight value of $v_1$ is smaller than 50% and weight value of $v_2$ is larger than 50%, the conversation generation unit 121 selects $v_2$ as a slot value. Then, when $v_1$ is selected as a slot value, the conversation generation unit 121 generates a response sentence of "Do you want $v_1$?". On the other hand, when $v_2$ is selected as a slot value, the conversation generation unit 121 generates a response sentence of "Do you want $v_2$?".

In addition, when selectable slot values are two of "$v_1$" and "$v_2$", and weight values of $v_1$ and $v_2$ are 50%, the conversation generation unit 121 selects $v_1$ and $v_2$ as a slot value. Then, when $v_1$ and $v_2$ are selected as a slot value, the conversation generation unit 121 generates a response sentence of "How about $v_1$ or $v_2$?".

In addition, when selectable slot values are multiple of "$v_1$", "$v_2$", ..., "$v_x$" and weight value of any slot value $v_1$ is larger than 50%, the conversation generation unit 121 selects $v_1$ as a slot value. Then, when $v_1$ is selected as a slot value, the conversation generation unit 121 generates a response sentence of "Do you want $v_1$?".

In addition, when selectable slot values are multiple of "$v_1$", "$v_2$", ..., "$v_x$" and weight value of any one slot value $v_i$ is larger than 40% and weight value of any one slot value $v_j$ which is different from the slot value $v_i$ is larger than 40%, the conversation generation unit 121 selects $v_i$ and $v_j$ as a slot value. Then, when $v_i$ and $v_j$ are selected as a slot value, the conversation generation unit 121 generates a response sentence of "How about $v_i$ or $v_j$?".

In addition, when selectable slot values are multiple of "$v_1$", "$v_2$", ..., "$v_x$" and weight value of any slot value $v_i$ is smaller than 40%, the conversation generation unit 121 does not select a slot value. Then, when no slot value is selected, the conversation generation unit 121 generates a response sentence of "What XX(slot name) do you want?".

In addition, the natural language processor 102 acquires text information indicating a user's answer to a response sentence. The natural language processor 102 determines whether the text information is an affirmative answer such as "Yes", or whether answer information is a negative answer such as "No" for example. The natural language processor 102 outputs the answer information indicating whether the user's answer is affirmative or negative to the weight value update unit 122. The weight value update unit 122 updates the weight values depending on whether or not the user's answer is an answer to select one secondary node from multiple secondary nodes. More specifically, if the answer information is an affirmative answer, the weight value update unit 122 recalculates a probability related to each of multiple selectable slot values and updates the value. On the other hand, if the answer information is a negative answer, the conversation generation unit 121 generates a response sentence to prompt the user to select any of the multiple slot values.

The speech synthesis unit 105 converts a response sentence generated by the conversation management unit 104 into speech. The speech converted by the speech synthesis unit 105 is outputted from a speaker (not shown).

Note that in the spoken dialog system shown in FIG. 2, a speech recognition unit 101, a natural language processor 102, a memory 103, a conversation management unit 104, and a speech synthesis unit 105 may be included in one device. On the other hand, the speech recognition unit 101, the natural language processor 102, the memory 103, the conversation management unit 104, and the speech synthesis unit 105 may be distributed to multiple devices. For example, a terminal device may include the speech recognition unit 101 and the speech synthesis unit 105, while a server communicably connected to the terminal device via a network may include the natural language processor 102, the memory 103, and the conversation management unit 104.

A spoken dialog processing of the spoken dialog system in the embodiment is described hereinafter.

Figure 4:
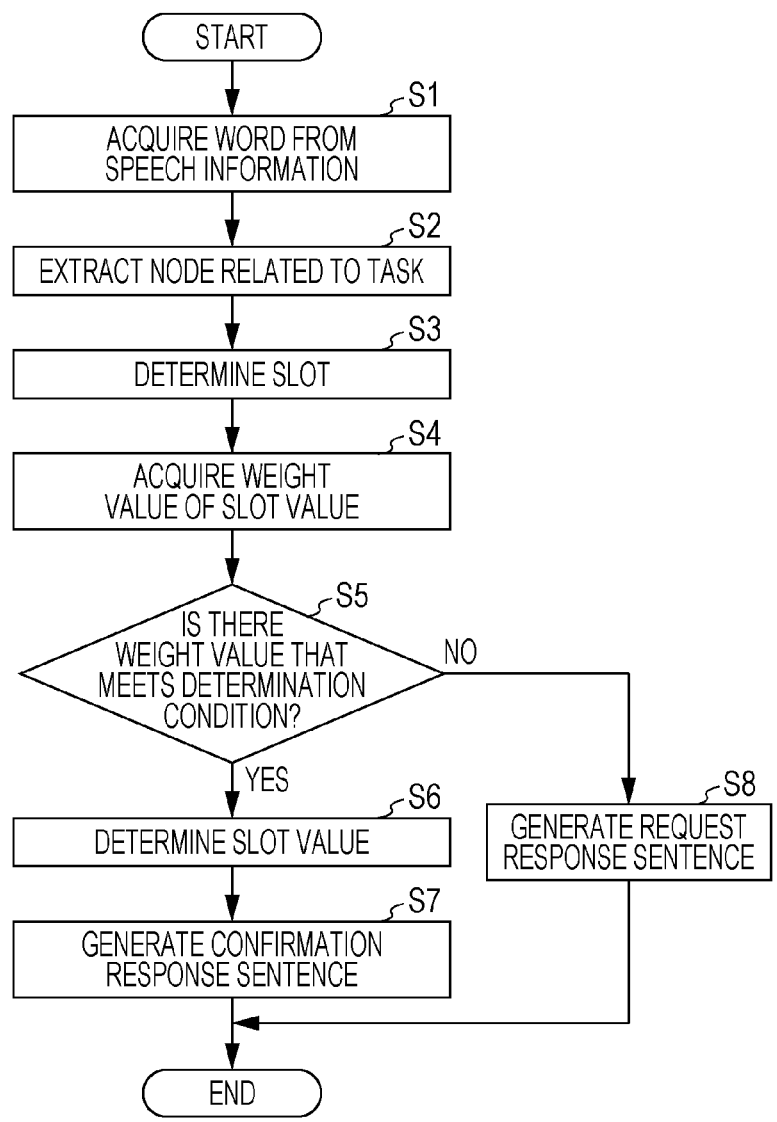
FIG. 4 is a flowchart illustrating a spoken dialog processing of the spoken dialog system in this embodiment.

FIG. 4 is a flowchart illustrating the spoken dialog processing of the spoken dialog system in the embodiment.

First, in step S1, the natural language processor 102 acquires a word from speech information indicating content of user's speech.

Then, in step S2, the natural language processor 102 searches a semantic network stored in the semantic network storage unit 111 and extracts from the semantic network a node (slot and a slot value) relevant to a task identified by the extracted word, based on relation information related among respective nodes.

Then, in step S3, the conversation generation unit 121 decides a slot into which a value needs to be inputted to perform the task.

Then, in step S4, the conversation generation unit 121 acquires from a weight value management table weight values of multiple slot values related to the decided slot.

Then, in step S5, the conversation generation unit 121 refers to the determination condition table stored in the determination condition table storage unit 113 and determines whether or not there is a weight value that meets a determination condition. Here, if it is determined that there is a weight value that meets the determination condition (YES in step S5), in step S6, the conversation generation unit 121 decides the slot value as a slot value corresponding to the weight value that meets the determination condition.

Then, in step S7, the conversation generation unit 121 uses the decided slot value to generate a confirmation response sentence. A confirmation response sentence is a response sentence to confirm with a user whether the user accepts the decided slot value.

On the other hand, if it is determined that there is no weight value that meets the determination condition (NO in step S5), in step S8, the conversation generation unit 121 generates a request response sentence. A request response sentence is a response sentence that requests a user to select a desired slot value from multiple selectable slot values.

A weight value update processing of the spoken dialog system in this embodiment is described hereinafter.

Figure 5:
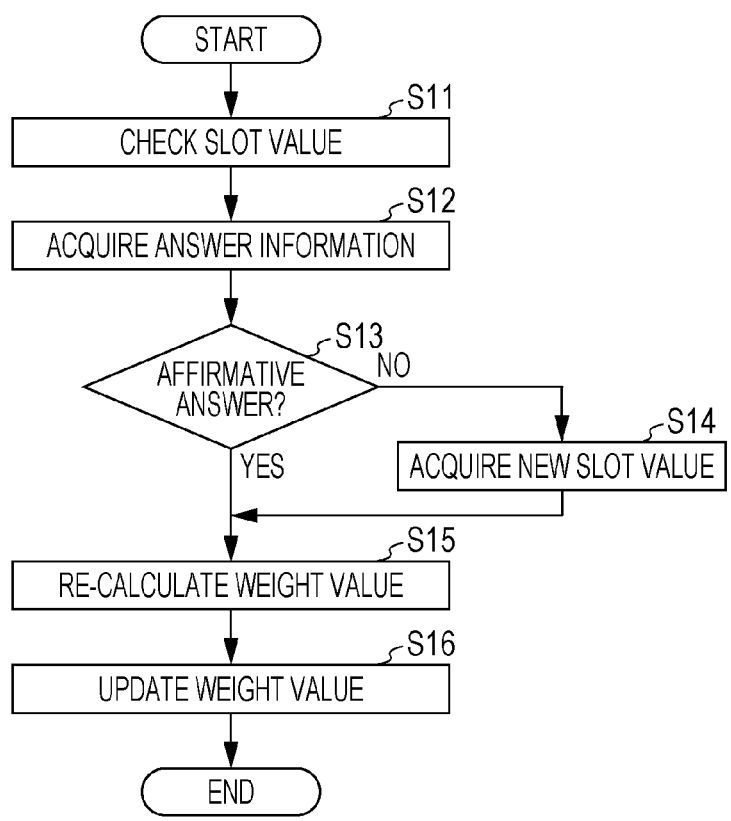
FIG. 5 is a flowchart illustrating a weight value update processing of the spoken dialog system in this embodiment.

FIG. 5 is a flowchart illustrating the weight value update processing of the spoken dialog system in this embodiment.

First, in step S11, the weight value update unit 122 checks a slot value included in the response sentence generated by the conversation generation unit 121.

Then, in step S12, the weight value update unit 122 acquires from the natural language processor 102 answer information indicating whether or not a user's answer to the response sentence is affirmative.

Then, in step S13, the weight value update unit 122 determines whether or not the answer information is an affirmative answer. Here, if it is determined that the answer information is a negative answer (NO in step S13), in step S14, the weight value update unit 122 acquires a new slot value. Here, if there are two selectable slot values, the weight value update unit 122 acquires, as a new slot value, the other slot value that is not presented to the user. In addition, if there are more than three selectable slot values, the weight value update unit 122 acquires, as a new slot value, a slot value selected by the user.

On the other hand, if it is determined that the answer information is an affirmative answer (YES in step S13), in step S15, the weight value update unit 122 recalculates a weight value.

Here, a method of calculating a weight value is described. First, a weight value management table before a weight value is calculated by the weight value update unit 122 stores an initial value of a weight value. If x slot values $v_1$, $v_2$, ..., $v_x$ are selectable for a slot, the number of users is n, and the numbers of users who select the respective slot values are $N_1$, $N_2$, ..., $N_x$, the weight values (probabilities) of the respective slot values are expressed as $N_1/n$, $N_2/n$, ..., $N_x/n$. Here, any numbers may be assigned to the number of users n and the numbers of users who select the respective slot values $N_1$, $N_2$, ..., $N_x$. For example, the numbers of users $N_1$, $N_2$, ..., $N_x$ may be set based on past statistical data. In addition, the initial values of the weight values may be all set to the same value. For example, when two slot values are selectable, the initial values of the weight values (probabilities) of the two slot values may be both set to 50%.

In addition, when the weight value update unit 122 recalculates a weight value, the weight value update unit 122 adds 1 to the number of users n, adds 1 to the number of users who selected the slot value $N_x$, and recalculates the weight values of all the selectable slot values. For example, when a slot value $v_2$ is selected, a weight value (probability) of each slot value $v_1$, $v_2$, ..., $v_x$ is $N_1/(n+1)$, $(N_2+1)/(n+1)$, ..., $N_x/(n+1)$.

Then, in step S16, the weight value update unit 122 stores the recalculated weight values in the weight value management table storage unit 112, and updates the weight values in the weight value management table.

Figure 6:
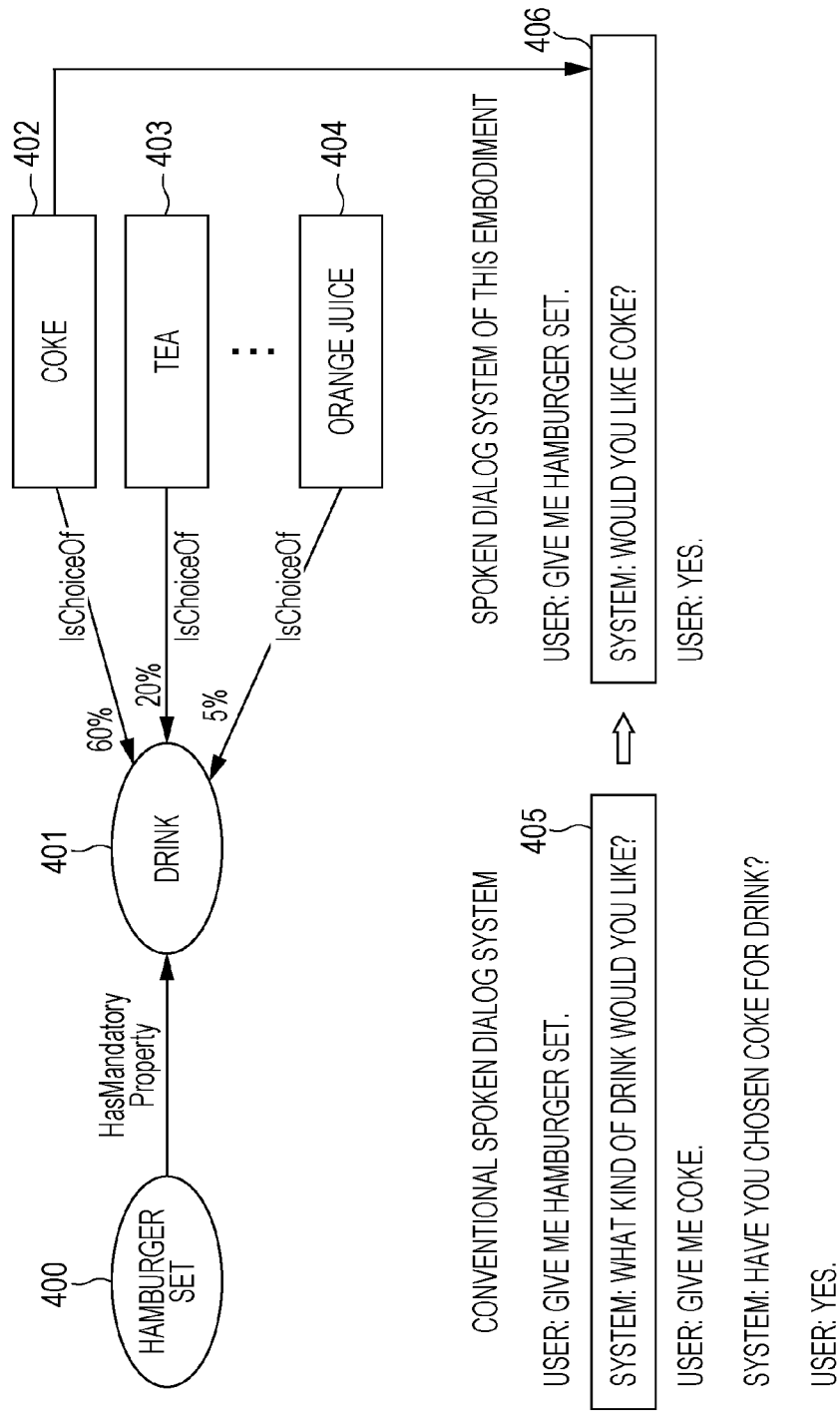
FIG. 6 illustrates a difference between the spoken dialog processing of the spoken dialog system in this embodiment and a spoken dialog processing of a conventional spoken dialog system.

FIG. 6 is a diagram illustrating a difference between the spoken dialog processing of the spoken dialog system in this embodiment and a spoken dialog processing of a conventional spoken dialog system. FIG. 6 illustrates an example of the spoken dialog processing when a user orders a hamburger set at a hamburger shop.

First, the user speaks "Give me a hamburger set." to the spoken dialog system.

In a conventional spoken dialog system, the system extracts words "hamburger set" from user's speech and identifies a task frame corresponding to the extracted words. In this case, a task frame providing a hamburger set is identified. Then, the conventional spoken dialog system identifies a slot necessary for performing the identified task frame and asks the user a question of which slot value the user selects of multiple slot values corresponding to the identified slot. In the example shown in FIG. 6, a slot is a drink, and a slot value is coke, tea, orange juice or the like. The conventional spoken dialog system creates a response sentence 405 of "What kind of drink would you like?" and outputs speech. In response to this, the user gives an answer of "Give me coke". Furthermore, in order to confirm content of what the user speaks, the conventional spoken dialog system creates a response sentence of "Have you chosen coke for drink?" and outputs speech. Then, the user gives an answer "Yes". When acquiring the affirmative answer from the user, the conventional spoken dialog system sets a slot value of a task frame and performs the task frame. Then, when values are inputted into all mandatory slots in the task frame, a task corresponding to the task frame is performed. If values are not inputted into all of the mandatory slots, such as a question to induce the user to input a value is given.

On the other hand, in the spoken dialog system in the embodiment, the system extracts words "hamburger set" from user's speech and extracts from a semantic network a node (domain, a slot, and a slot value) related to the task identified by the extracted words. In the example shown in FIG. 6, a domain 400 is a "hamburger set", a slot 401 is "drink", and slot values 402, 403, 404 are "coke", "tea", and "orange juice" or the like, respectively.

Then, the spoken dialog system in the embodiment decides a slot into which a value needs to be inputted to perform the task. Here, a slot to be decided is a drink. Then, the spoken dialog system in the embodiment acquires from a weight value management table weight values of multiple slot values related to the decided slot. In the example shown in FIG. 6, a weight value of coke, which is the slot value, is 60%, a weight value of tea, which is a slot value, is 20%, and a weight value of orange juice, which is a slot value, is 5%.

Then, the spoken dialog system in the embodiment determines whether or not there is a weight value that meets a determination condition. In this case, since the weight value of coke is 60%, the spoken dialog system in the embodiment determines that there is a weight value that meets the determination condition. Then, the spoken dialog system in the embodiment decides that a slot value is "coke". Then, the spoken dialog system in the embodiment creates a response sentence 406 of "Would you like coke?" and outputs speech. In response to this, the user gives an answer "Yes". Acquiring an affirmative answer from the user, the spoken dialog system in the embodiment performs a task of generating a response sentence to user's speech for offering a hamburger set.

As described above, in the conventional system, the system asks a user a question of what drink the user wants and determines a user's answer through speech recognition. When the user selects coke, the conventional system asks the user again a question of whether or not the user's choice is coke, determines a user's answer through speech recognition, and decides a drink.

In contrast to this, in the system of the disclosure, the system does not ask a user a question of what drink the user prefers, but assigns a weight value to each drink depending on what drinks users selected in the past, and asks the user a question of whether or not the user selects coke. For example, if coke was selected with a probability of 60% in the past, the system of the disclosure confirms with the user if a drink which the user prefers is coke. Then, the system of the disclosure determines the user's answer through speech recognition and decides that the drink is coke if the user's affirmative answer is obtained.

In this case, compared with the conventional system, the system of the disclosure does not need to reconfirm a drink and can thus reduce interaction time between the system and the user, as well as processing time of the system.

A variation of the spoken dialog system in this embodiment is described hereinafter.

Figure 7:
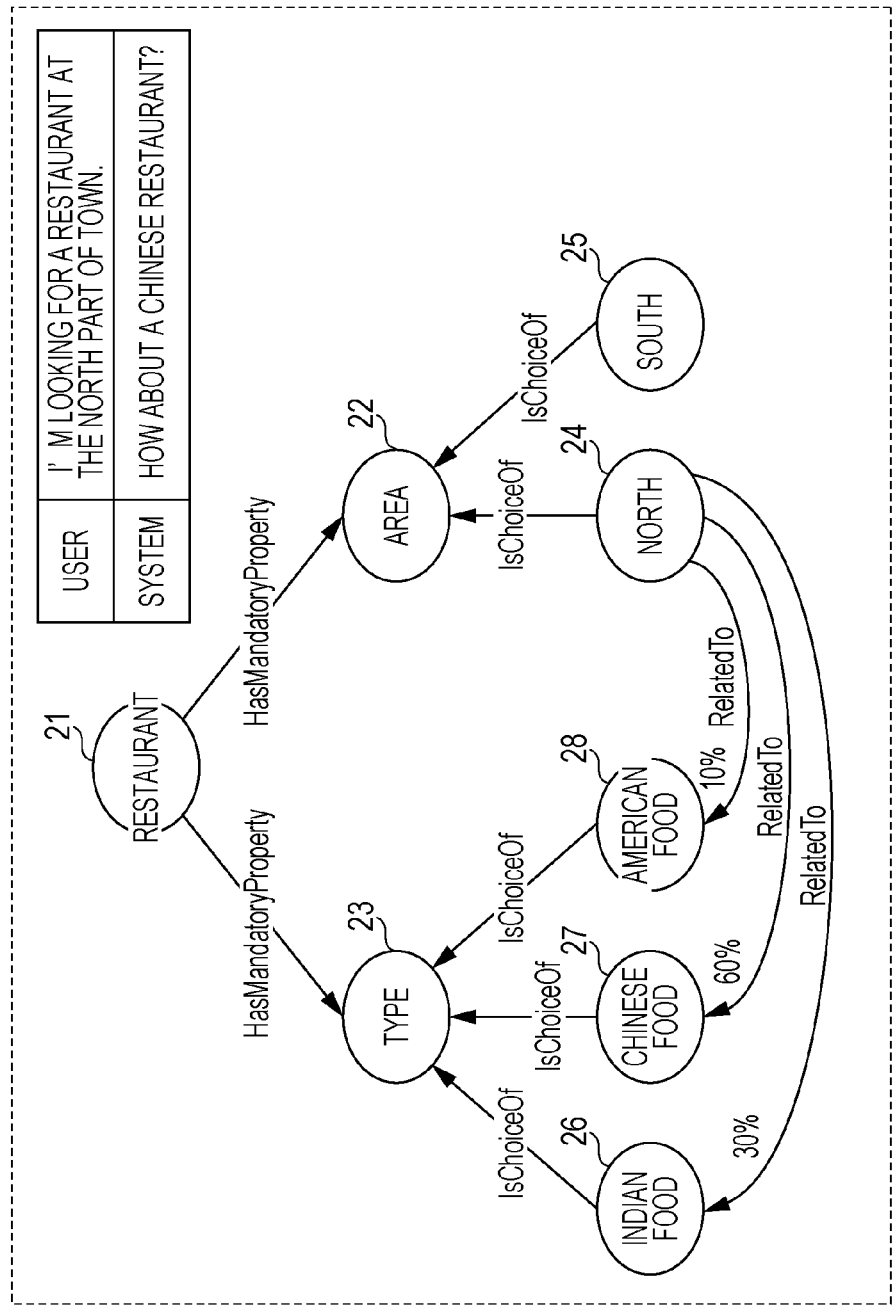
FIG. 7 illustrates an example of a semantic network of a spoken dialog system in a variation of this embodiment.

FIG. 7 is a diagram illustrating an example of a semantic network of the spoken dialog system in this embodiment. The semantic network shown in FIG. 7 represents an example of a semantic network to be used when searching for a restaurant.

In FIG. 7, a node 21 representing a "restaurant" is linked to a node 22 representing an "area" and a node 23 representing a "type". The node 22 representing an "area" and the node 23 representing a "type" are mandatory slots. The node 22 representing an "area" is linked to a node 24 representing "north" and a node 25 representing "south". The node 24 representing "north" and the node 25 representing "south" are slot values of the node (slot) 22 representing an "area". In addition, the node 23 representing a "type" is linked to a node 26 representing "Indian food", a node 27 representing "Chinese food", and a node 28 representing "American food". The node 26 representing "Indian food", the node 27 representing "Chinese food", and the node 28 representing "American food" are slot values of the node (slot) 23 representing a "type".

Furthermore, in the variation shown in FIG. 7, slot values of different slots are linked, and the node (slot value) 24 representing "north" is linked to the node (slot value) 26 representing representing "Indian food", the node (slot value) 27 representing "Chinese food", and the node (slot value) 28 representing "American food". A weight value of 30%, for example, is assigned to connection of the node 24 representing "north" and the node 26 representing representing "Indian food". In addition, a weight value of 60%, for example, is assigned to connection of the node 24 representing "north" and the node 27 representing "Chinese food". Furthermore, a weight value of 10%, for example, is assigned to connection of the node 24 representing "north" and the node 28 representing "American food". More specifically, a probability that the Indian food is selected after the area of north is selected is 30%, a probability that the Chinese food is selected after the area of north is selected is 60%, and a probability that the American food is selected after the area of north is selected is 10%.

In the system of the embodiment, if a user speaks "I'm looking for a restaurant at the north part of town.", the system confirms with the user whether or not the user prefers a Chinese restaurant, determines a user's answer through speech recognition, and decides a restaurant.

The weight value management table storage unit 112 relates weight values to combinations of a first secondary node of multiple secondary nodes which is associated with a first primary node of multiple primary nodes and each of the multiple secondary nodes associated with a second primary node of the multiple primary nodes, and stores them. Here, the primary nodes are slots and the secondary nodes are slot values.

The natural language processor 102 determines whether or not the first secondary node is identified. If the first secondary node is identified, the conversation generation unit 121 selects a second secondary node from the multiple secondary nodes associated with the second primary node, based on the weight values related to the respective combinations of the first secondary node and the multiple secondary nodes associated with the second primary node.

A spoken dialog processing of the spoken dialog system in the variation of this embodiment is described hereinafter.

FIG. 8 is a flowchart illustrating a spoken dialog processing of the spoken dialog system in the variation of this embodiment.

Since processings in step S21 and step S22 are same as processings in steps S1 and S2 shown in FIG. 4, descriptions thereof are omitted.

Then, in step S23, the natural language processor 102 determines whether or not any slot in the semantic network is identified. For example, in the example shown in FIG. 7, a slot representing an "area" from content of user's speech is identified. Here, if it is determined that any slot is identified (YES in step S23), in step S24, the natural language processor 102 selects the identified slot.

Then, in step S25, the natural language processor 102 selects a next slot linked to the identified slot. For example, in the example shown in FIG. 7, a slot representing a "type" linked to the slot representing an "area" is selected.

Then, in step S26, the conversation generation unit 121 acquires a slot value of the identified slot and a weight value related to each of multiple slot values of the next selected slot from the weight value management table. Note that the weight value management table relates weight values to combinations of one slot value of multiple slot values associated with one slot of multiple slots and each of multiple slot values associated with other slot of the multiple slots and stores them.

Then, in step S27, the conversation generation unit 121 refers to a determination condition table stored in the determination condition table storage unit 113 and determines whether or not there is a weight value that meets a determination condition. Here, if it is determined that there is a weight value that meets the determination condition (YES in step S27), in step S28, the conversation generation unit 121 decides a slot value corresponding to the weight value that meets the determination condition. For example, in the example shown in FIG. 7, a slot value representing "Chinese food" is decided.

Then, in step S29, the conversation generation unit 121 uses the decided slot value to generate a confirmation response sentence. The confirmation response sentence is a response sentence to confirm with a user whether the user's choice is the decided slot value. For example, in the example shown in FIG. 7, the confirmation response sentence of "How about a Chinese restaurant?" is generated.

On the other hand, if it is determined that no slot is identified (NO in step S23) or if it is determined that there is no weight value that meets the determination condition (NO in step S27), in step S30, the conversation generation unit 121 generates a request response sentence. The request response sentence is a response sentence requesting a user to select a desired slot value from multiple selectable slot values. For example, in the example shown in FIG. 7, when a user speaks "I'm looking for a restaurant.", the spoken dialog system needs to determine a slot representing an "area" and a slot representing a "type". Thus, the conversation generation unit 121 generates the request response sentence to select a slot value of any of the slots of "area" and "type". For example, the conversation generation unit 121 generates the request response sentence of "Which do you prefer, north or south part?" or the request response sentence of "Which do you prefer, Indian food, Chinese food, or American food?".

Note that in step S23, if it is determined that any slot is not identified, the spoken dialog processing may be terminated.

In addition, while the weight value in this embodiment represents a probability with which each of selectable slot values was selected in the past, the disclosure is not limited thereto, and a value may be assigned to each of selectable slot values. For example, if a slot value is selected by a user, the weight value update unit 122 may add 1 to a weight value of the selected slot value.

In addition, the spoken dialog system may set any weight value for a slot value. For example, a seller can recommend to users an item that they especially wish to sell by setting a weight value of a slot value of the item that they especially wish to sell higher than that of a slot value of other items.

In addition, the spoken dialog system may set any weight value depending on a period (season). For a slot to which frequency of reference widely varies in a particular period, the system may set a certain value with considering possible influence of the period, and replace a weight value updated so far by an update processing with the certain value every time the period comes. In addition, the system may prepare information on weight values corresponding to every period, and change the weight values of all slots to the corresponding values when the period comes. The values thus changed may be changed even before the period elapses. In other words, once the weight values are set corresponding to the period, the weight values may be updated in accordance with the update processing.

In addition, in the embodiment, while text information converted from user's speech is used, the disclosure is not particularly limited thereto, and text information that is directly inputted by an input device such as a keyboard or a touch panel may be used.

In addition, the spoken dialog system of the embodiment may include a speaker identification unit for identifying a user who speaks. In this case, the weight value management table relates a slot value to a weight value for each identified user and stores them. This enables generation of a response sentence corresponding to each user, thus being able to further reduce interaction time between the system and a user.

In addition, in the spoken dialog system of the embodiment, a period or number of updating times of a weight value may be set. In this case, the spoken dialog system may stop updating of the weight value when predetermined time elapses after updating of the weight value starts. The spoken dialog system may also stop updating of the weight value when the number of updating times reaches a predetermined number of times. It is likely that as the number of updating times of the weight value increases, the weight value converges to a certain constant value. Thus, processing load of the spoken dialog system can be alleviated by setting a period or the number of times of updating the weight value.

In addition, since there are also present items that are sold only in a predetermined season or for a predetermined period, the spoken dialog system of the embodiment may set a slot value that can be selected only in a predetermined season or for a predetermined period and update a weight value only in a predetermined season or for a predetermined period.

Simulation experiments were conducted to quantitatively confirm the effect of the disclosure. FIG. 9A and FIG. 9B are diagrams respectively illustrating conversation examples performed under two different conditions. Both FIG. 9A and FIG. 9B illustrate an example of conversation between a sales clerk and a customer at a hamburger shop under the same circumstance.

In the conversation example shown in FIG. 9A, a question sentence on the side of a sales clerk is generated based on a manner (condition) of asking a question that is used by a conventional spoken dialog system, and an answer on the side of a customer is given thereto. In the conversation example shown in FIG. 9B, a question sentence on the side of a sales clerk is generated based on a manner (condition) of asking a question that is used by the spoken dialog system in the disclosure, and an answer on the side of a customer is given thereto. A description is given hereinafter, by comparing the two manners (conditions) of asking a question.

In FIG. 9A and FIG. 9B, "Would you like side salad or French fries?" (conversation sentence 1001) corresponds to "Would you like French fries?" (conversation sentence 2001). Then, when content shown by the conversation sentence 2001 is outputted as a question from the spoken dialog system, a determination has been made that a probability that "french fries" is ordered as "meal side" is equal to or larger than a threshold. Speech of the customer thereto is, respectively, "french fries" in the conversation sentence 1002 and "Yes" in the conversation sentence 2002. Both the question and the answer are shorter in the example shown in FIG. 9B and efficient. Similarly, in a conversation sentence 2005 corresponding to a conversation sentence 1005 "Would you like large, small or medium?", based on the statistics that a probability of ordering "medium" is high, the way of asking changes from the conversation sentence 1005 to an efficient way of asking of "Would you like medium?", and a customer's answer thereto is "Yes" of a conversation sentence 2006 in the example of the spoken dialog system in the disclosure while it is "medium" in a conversation sentence 1006 in the conventional example. Thus, content of answer is shortened.

On the other hand, compared with "What kind of meal drink would you like?" in a conversation sentence 1007 of the conventional example, "Would you like coke?" of a conversation sentence 2007 is outputted as a proposal-type question in the example of the spoken dialog system according to the disclosure, which is shorter than the conventional example. However, while a customer's answer thereto is "Hi-orange lavaburst" in a conversation sentence 1008 in the conventional example, it is "No. Hi-orange lavaburst" in a conversation sentence 2008 in the example of the spoken dialog system of the disclosure. The conversation sentence is partially longer in the spoken dialog system of the disclosure. When there is no choice with which multiple particularly high probabilities are expected, there is no big difference as shown between the conversation sentence 1003 and the conversation sentence 2003, or between the conversation sentence 1004 and the conversation sentence 2004. Contents of the orders accepted in the conversation examples shown in FIG. 9A and FIG. 9B are accepted order content 1010 and order content 2010, respectively, which are the completely same result.

When the number of total characters in the two conversations thus conducted is counted, it is 330 characters (1009) and 273 characters (2009), respectively. It is seen that the number of characters in the conversation is smaller, more specifically, the conversation is shorter, in the question sentence on the side of the sales clerk with the manner (condition) of asking a question that is used by the spoken dialog system of the disclosure. Here, while both systems are compared by using the number of characters, time required for conversation can be estimated by multiplying the number of characters by a predetermined coefficient. When the customer's answer to the question of the proposal-type on the side of the shop is negative, as described above, time required for conversation is partially long. However, since a question of Yes/No type is given only when it is expected with a high probability that a customer's answer to a question of a proposal-type on the side of the shop is affirmative, it can be said that it is a rare case (low probability) that time required for conversation is longer in a case in which a question of a proposal-type is outputted than a question in the conventional example.

Similar to this one example, orders of 100 examples were simulated. Then, the total number of characters was 28746 characters in the conventional method and 26168 characters in the method according to the disclosure. In the method according to the disclosure, total length of a conversation is reduced by 11.4% than the conventional example. Thus, it was confirmed that the effect of the dialog method in the spoken dialog system of this disclosure was high.

The dialog method, the dialog program, and the dialog system according to this disclosure can reduce interaction time between the dialog system and a user, as well as processing time of the dialog system, and are thus useful as a dialog method in a dialog system for responding to user's speech, a dialog program for responding to user's speech, and a dialog system for responding to user's speech.

What is claimed is:

1. A computer implemented speech recognition method for responding to user's speech comprising:

acquiring, by a processor, speech information indicating content of user's speech;

identifying, by the processor, a primary node corresponding to the speech information from multiple nodes which are stored in a memory, the multiple nodes being necessary for performing a task of generating a response sentence to the user's speech while associating the multiple nodes with each other;

determining, by the processor, whether each of weight values each related to multiple secondary nodes associated with the identified primary node is larger than a predetermined value or not;

when a weight value related to one secondary node is determined to be larger than the predetermined value,
selecting the one secondary node from the multiple secondary nodes,
generating the response sentence which asks to a user whether a content corresponding to the selected one secondary node is needed or not, and
outputting the response sentence to the user using a speaker;

when each of weight values related to two or more secondary nodes is determined to be larger than the predetermined value,
selecting the two or more secondary nodes from the multiple secondary nodes,
generating the response sentence which asks to the user to select one of multiple contents, each of the multiple contents corresponding to each of the two or more secondary nodes, and
outputting the response sentence to the user using the speaker; and when each of the weight values is determined not to be larger than the predetermined value,
generating the response sentence which asks to the user what is needed related to the identified primary node, and
outputting the response sentence to the user using the speaker.

2. The computer implemented method according to claim 1, wherein information indicating an answer of the user to the response sentence is acquired, and the weight values are updated depending on whether or not the user's answer is an answer to select one secondary node from the multiple secondary nodes.

3. The computer implemented method according to claim 1, wherein
- a weight value is related to a combination of a first secondary node of multiple secondary nodes associated with a first primary node of multiple primary nodes and each of multiple secondary nodes associated with a second primary node of the multiple primary nodes,
- the processor determines whether the first secondary node is identified, and
- in a case that the first secondary node is identified, a second secondary node is selected from the multiple secondary nodes associated with the second primary node, based on the weight values related to respective combinations of the first secondary node and the multiple secondary nodes associated with the second primary node.

4. A non-transitory medium having thereon a program for causing a processor to execute operations included in the method of claim 1.

5. The computer implemented method according to claim 1,
- wherein each of the weight values is updated in each session.

6. A speech recognition apparatus for responding to user's speech comprising:
- a processor; and
- a memory having thereon a program, the program causing the processor to execute operations including:
- acquiring speech information indicating content of user's speech;
- identifying a primary node corresponding to the speech information from multiple nodes which are stored in a recording medium, the multiple nodes being necessary for performing a task of generating a response sentence to the user's speech while associating the multiple nodes with each other;
- determining whether each of weight values each related to multiple secondary nodes associated with the identified primary node is larger than a predetermined value or not;
- when a weight value related to one secondary node is determined to be larger than the predetermined value,
  - selecting the one secondary node from the multiple secondary nodes,
  - generating the response sentence which asks to a user whether a content corresponding to the selected one secondary node is needed or not, and
  - outputting the response sentence to the user using a speaker;
- when each of weight values related to two or more secondary nodes is determined to be larger than the predetermined value,
  - selecting the two or more secondary nodes from the multiple secondary nodes,
  - generating the response sentence which asks to the user to select one of multiple contents, each of the multiple contents corresponding to each of the two or more secondary nodes, and
  - outputting the response sentence to the user using the speaker; and
- when each of the weight values is determined not to be larger than the predetermined value,
  - generating the response sentence which asks to the user what is needed related to the identified primary node, and
  - outputting the response sentence to the user using the speaker.

* * * * *